United States Patent [19]

Puschner

[11] 4,169,224

[45] Sep. 25, 1979

[54] APPARATUS FOR OBTAINING FEEDBACK SIGNALS FOR CONTROLLING A PARAMETER OF AN ARC WELDING MACHINE

[76] Inventor: Peter Puschner, Dreilanderweg 127, D-5100 Aachen-Vaalserquartier, Fed. Rep. of Germany

[21] Appl. No.: 839,549

[22] Filed: Oct. 4, 1977

[30] Foreign Application Priority Data

Oct. 7, 1976 [DE] Fed. Rep. of Germany ....... 2645223

[51] Int. Cl.² .............................................. B23K 9/10
[52] U.S. Cl. ................ 219/124.02; 219/123; 219/124.1; 219/124.22
[58] Field of Search ............. 219/123, 124.02, 124.03, 219/124.22, 124.34, 130.31, 130.32, 130.33, 124.1

[56] References Cited

U.S. PATENT DOCUMENTS

| | | | |
|---|---|---|---|
| 2,949,391 | 8/1960 | Anderson | 219/124.02 |
| 2,994,763 | 8/1961 | Schultz | 219/123 |
| 3,484,667 | 12/1969 | Wofsey | 219/124.34 |
| 3,511,966 | 5/1970 | Bone | 219/124.03 |
| 3,538,299 | 11/1970 | Daggett | 219/124.03 |
| 3,551,637 | 12/1970 | Lampson | 219/123 |

FOREIGN PATENT DOCUMENTS

2631250 2/1977 Fed. Rep. of Germany ...... 219/124.22

Primary Examiner—E. A. Goldberg
Assistant Examiner—Clifford C. Shaw
Attorney, Agent, or Firm—Lerner, David, Littenberg & Samuel

[57] ABSTRACT

Apparatus is provided for controlling a parameter of an arc welding machine, such as the height and/or the lateral position of the welding tool. The apparatus includes a parallel circuit having first and second branches connected to a source of voltage, wherein the first branch includes the arc welding machine to be controlled, and wherein the second branch includes an electrical analog of the current-voltage characteristics of the welding machine when operating as desired. A differential amplifier is provided for comparing the current in the first and second branches and providing a parameter-indicative signal representing the current difference between the first and second branches. In addition, a control circuit is responsive to the parameter-indicative signal and is provided for adjusting various parameters of the welding machine, including the height of the welding tool and/or the lateral position of the welding tool.

12 Claims, 7 Drawing Figures

APPARATUS FOR OBTAINING FEEDBACK SIGNALS FOR CONTROLLING A PARAMETER OF AN ARC WELDING MACHINE

FIELD OF THE INVENTION

The invention relates to an apparatus for providing an electrical analog of a welding machine to be controlled to obtain feedback signals for the control of an arc welding machine.

BACKGROUND OF THE INVENTION

When an arc welding machine is not operating as desired, feedback signals are generally obtained and superimposed on electrical operating values of the welding machine, i.e., specifically welding current and voltage or a mathematical combination of these two quantities. The feedback signals represent a measure of the deviation, which can be used for optimum control of the welding machine.

The feedback signals are obtained either through the course of the welding process itself or through accessories which influence the welding process, for example, deflecting the arc from its stationary position. These feedback signals are typically obtained as a modulation of otherwise stationary operating values of the welding machine.

However, all operating data of an arc welding machine, such as arc current, arc flow, arc length, brightness, and temperature of arc, etc., have an inherent noise factor. Additional interference comes from fluctuations in the supply voltage for the welding machine. These noise factors are produced through material transfer in the arc, irregularities in the weld joint, irregularities in wire feed and wire size, and other factors.

It is therefore an object of the present invention to obtain the feedback signals from the welding machine so as to eliminate noise and other influences originating at the fluctuating energy source. These include fluctuations in voltage and pulsation of electrical operating values as occurring in welding energy sources employing bridge rectifiers.

SUMMARY OF THE INVENTION

Briefly, in accordance with the principles of the present invention, apparatus is provided for controlling a parameter of an arc welding machine, such as the height and/or the lateral position of the welding tool. The apparatus includes a parallel circuit, such as a bridge circuit, having first and second branches connected to a source of voltage, wherein the first branch includes the arc welding machine to be controlled, and wherein the second branch includes an electrical analog of the current-voltage characteristics of the welding machine when operating as desired. A differential amplifier is connected to the bridge circuit for comparing the current in the first and second branches and providing a parameter-indicative signal representing the current difference between the first and second branches. In addition, means responsive to the parameter-indicative signal are provided for adjusting various parameters of the welding machine, including the height of the welding tool and/or the lateral position of the welding tool.

Advantageously, the electrical analog is arranged so that it is in parallel to the welding machine, and both are connected to the same source and through the same source terminals. In this manner, interference and fluctuations of the welding voltage source have the same effect on the welding machine and on the electrical analog, so that their effects are canceled out.

In addition, the parallel branches both have the same voltage, and the current value of the second branch which includes the electrical analog is preset, so that only the current value of the first branch which includes the welding machine can change. Such changes in current value are caused by changes in the parameters of the welding machine and may then be used for automatic adjustment of the parameters of the welding machine.

Advantageously, the electrical analog is designed so that it will use only a small amount of power, in the range of milliwatts, and not place any additional strain on the welding energy source. Thus, voltage-related interferences can be eliminated with little expense and power loss, and the desired current or characteristic values can be obtained.

In developing an electrical analog of the current-voltage characteristics of the welding machine, it should be noted that the welding arc has a complex impedance, and the static and dynamic behavior of the weld arc must be taken into account. Advantageously, the electrical analog is formed by a passive network including a resistor in the parallel circuit with a resistor and a condenser. In one embodiment, the electrical analog is adjustable to the desired parameters, through a setting device, such as a potentiometer.

An imbalance in the bridge circuit represents the need for a change of a parameter of the welding machine in operation. During the usual welding operation, various parameters are maintained constant, such as the inert gas volume per unit of time, the wire feed speed, and the welding speed. Therefore, a bridge imbalance will yield the number and the (plus/minus) sign of the output signal—furnished by the bridge amplifier—indicating the desired change of a parameter, such as the distance of the welding unit to the welding piece, the arc length, and the so-called free end of the wire. The output signal is fed into a control which automatically corrects the distance of the welding equipment and, thus, arc length and free wire end. It is also desired that higher frequency noise levels, for example, over 5 to 10 Hz, are suppressed through integration of the output signal of the bridge amplifier.

Advantageously, the process for the reduction of the noise level is employed in conjunction with the above-described electrical analog so that the output signal of the bridge amplifier can be employed for the regulation of the desired operating parameters of the welding machine.

Finally, in accordance with the present invention, if the welding process is initiated by deflection of the arc from its stationary position by means of a controllable electromagnet, the resultant change of electrical operating values of the welding machine is obtained as an output signal from the bridge amplifier and may be used for lateral guidance of the welding tool along the weld joint, as described in U.S. patent application Ser. No. 707,012 filed July 20, 1976, now abandoned of the applicant. Simultaneously, an intermediate value of the output signal obtained from the bridge amplifier represents a measure of the distance between the welding tool and the welding piece so that in the event of deviation from a given desired value, it can be adjusted to the optimum distance.

BRIEF DESCRIPTION OF THE DRAWINGS

Further objects, features, and advantages of the present invention will become apparent upon the consideration of the following detailed description of a presently preferred embodiment when taken in conjunction with the accompanying drawing, wherein.

DETAILED DISCUSSION OF PREFERRED EMBODIMENTS

During an undisturbed arc welding process, values for welding current and welding voltage will stablize. "Stablize" here means that—for the duration of the welding process—constant means values of the process values result. However, the analysis of stable welding parameters with a high resolution measuring instrument, such as a cathode ray ascilloscope, show that the process values actually vary in a broad frequency band around the stable means values.

Figure 1:
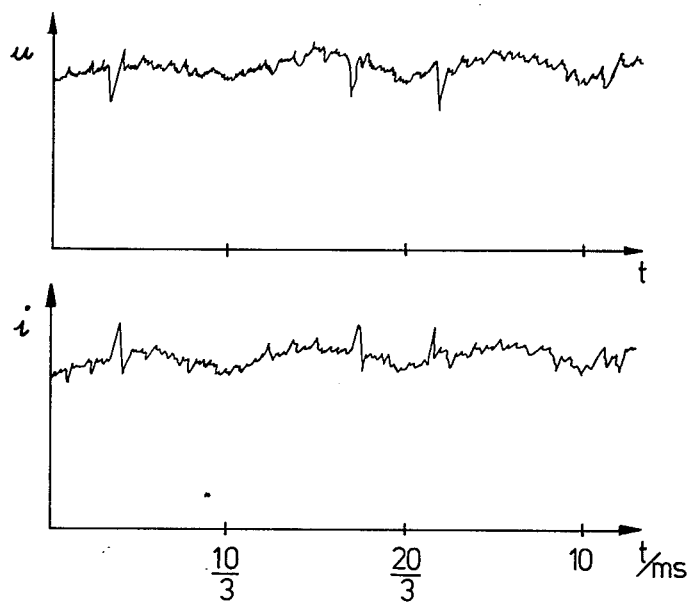
FIG. 1 shows the waveforms of welding voltage and welding current for a normal inert gas welding process employing a welding voltage source having a bridge rectifier.

FIG. 1 shows the static behavior of weld voltage u(t) and weld current i(t), as a function of time t, of an inert gas arc welding machine employing a welding voltage source having a bridge rectifier. As can be seen, a time correlation exists between voltage u(t) and current i(t).

Figure 2:
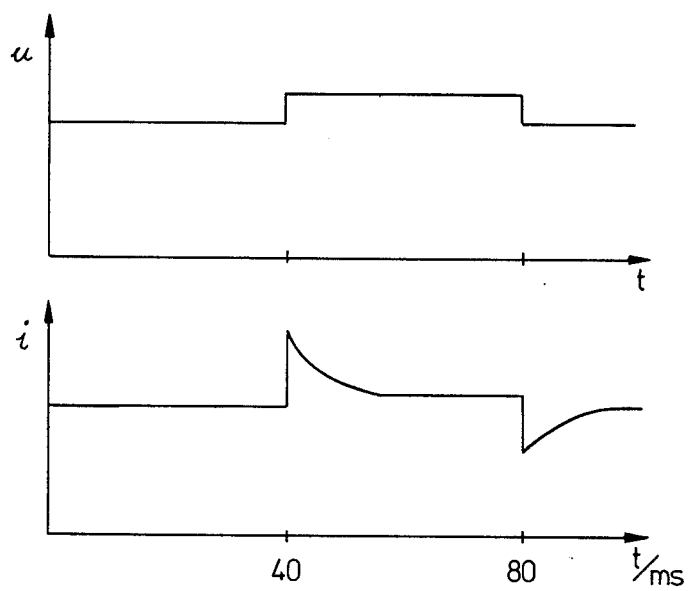
FIG. 2 shows the voltage and current characteristics of a MIG-weld arc during sudden changes in welding current.

The dynamic impedance response of an electrical network, and of a welding machine can be determined by known excitation, for example, by means of a transient signal. FIG. 2 shows the current response i(t) of a welding machine to an impressed voltage u(t). It can be observed that a given impressed voltage u(t) produces a defined reaction of the current i(t) which is clearly distinguished from the original undisturbed, stable signal.

Figure 3:
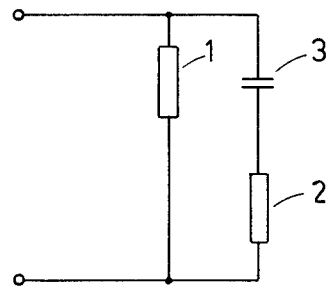
FIG. 3 shows a passive two-terminal electrical analog having the current-voltage characteristics as that shown in FIG. 2.

FIG. 3 shows an electrical two-terminal network whose electrical behavior has the same current-voltage characteristics as a welding machine while operating and whose response to a change in welding current is represented in FIG. 2. This electrical two-terminal arrangement consists of an ohmic resistance corresponding to the static characteristic of the welding machine, joined in parallel with a series arrangement of an ohmic resistance 2 and a condenser 3 corresponding to the dynamic characteristics. Since this will produce a similar current response to the same voltage input, it can be employed as an electrical analog to the welding machine during welding.

Thus, when the welding parameters—i.e. the electrical unit of current feed-in, burner, arc and welding piece—as well as the electrical analog shown in FIG. 3, are operated from the same voltage source, a deviation of the welding machine from the desired value can be determined by a comparison of the electrical operating values of the welding machine with the electrical operating values of the electrical analog. Although many operating parameters influence the electrical behavior of the welding machine, and can be monitored and controlled with the process described herein, we shall now explain preferred embodiment in which the parameter to be controlled to correct deviations is the distance between the welding tool and the welding piece or the arc length.

Figure 4:
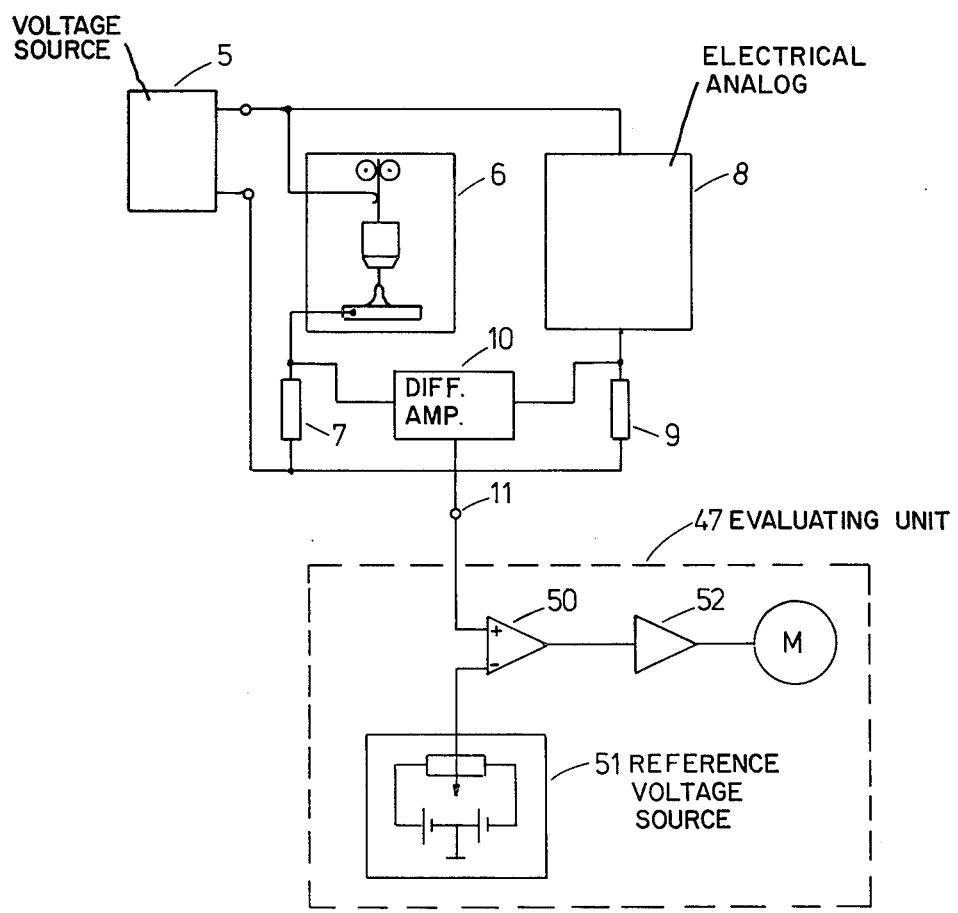
FIG. 4 shows a bridge circuit for comparison of the welding machine to be controlled and the electrical analog.

FIG. 4 shows a circuit which produces an output signal which depends on the comparison between the electrical operating values of a welding machine and the electrical operating values of the electrical analog. The terminals of a welding energy source or voltage source 5 are connected to a first series arrangement, formed by the welding machine 6 and a measuring resistor 7, and a second series arrangement, which is formed by an electrical analog 8 and a measuring resistor 9. The schematically indicated welding machine 6 is intended to incorporate the entire welding system which influences the electrical operating values, including the lead-ins, the burner, the arc and the welding piece. The two-terminal arrangement shown in FIG. 3 can be used as electrical analog 8.

Each of the series connections form one branch of a bridge circuit. Connected to the junctions between the measuring resistor 7 and the welding machine 6 and between measuring resistor 9 and electrical analog 8, is a differential amplifier 10 which furnishes at its output terminal 11, a parameter-indicative signal which is a measure of the imbalance of the bridge circuit. The output signal on terminal 11 is zero only when the electrical behaviors of the welding machine 6 and of analog 8 are identical, i.e. when they have corresponding current values. In addition, the analog 8 and the measuring resistor 9 can be designed so that a current of only a few ma (milli amperes) flows through this branch. Advantageously, this circuit eliminates voltage related interferences from the output signal on terminal 11.

Figure 5:
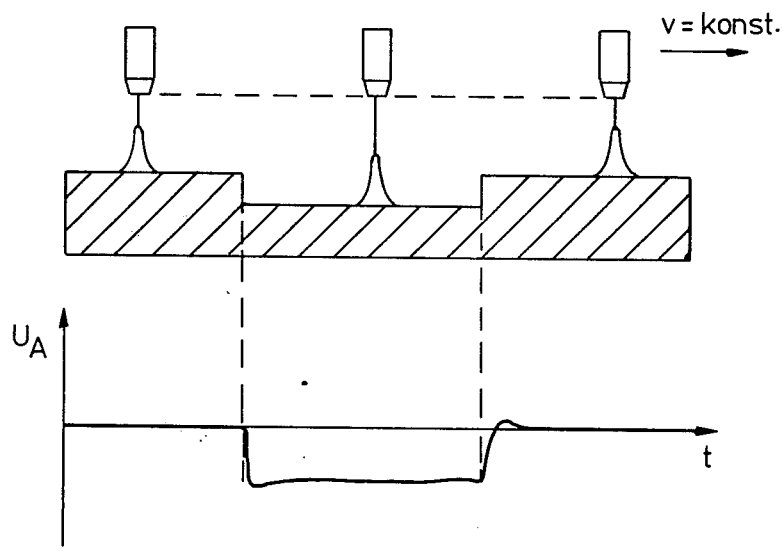
FIG. 5 shows the waveform of the output signal of a bridge amplifier connected to the bridge circuit when the welding tool passes over a low spot.

FIG. 5 shows schematically the welding tool passing over a discontinuous surface in the base material, with an arc welding and a melt electrode. The diagram $U_A(t)$ is a measure of the distance between the burner and the welding piece. This signal is evaluated in a unit 47 (FIG. 4) and is used to control the height of the burner.

The evaluating unit 47 includes a subtraction circuit 50 in which the signal of a reference voltage source 51 is deducted from the output signal on terminal 11; the former producing a signal representing the desired value of the distance between the burner and welding piece. At the correct or desired distance of burner to welding piece, and thus correct arc length, the signal on terminal 11 and the signal of reference current source 51 are identical so that the subtraction circuit 50 produces an output signal of zero. If the two signals differ, the output signal of the subtraction circuit 50 does not equal zero and is amplified in an amplifier 52 and, through a servo motor M, is used for height adjustment of the welding tool. The distance between the burner and welding piece is adjusted until the output signal of the subtraction circuit 50 returns to zero.

The electrical operating values of an arc welding machine are subject to a high noise level so that the output or feedback signals for the control of the welding machine—as obtained from such electrical operating values—are possibly effected by the noise levels. This is, for example, applicable to the feedback signal which results when the welding tool passes over a low spot in the base material. FIG. 5 shows this signal or characteristic value $U_A(t)$ without noise level. In addition, as to feedback signals which are, for example, produced by deflection of the arc from its normal position, their effect on the electrical operating values of the welding machine may possibly be lost in interference (noise).

Figure 6:
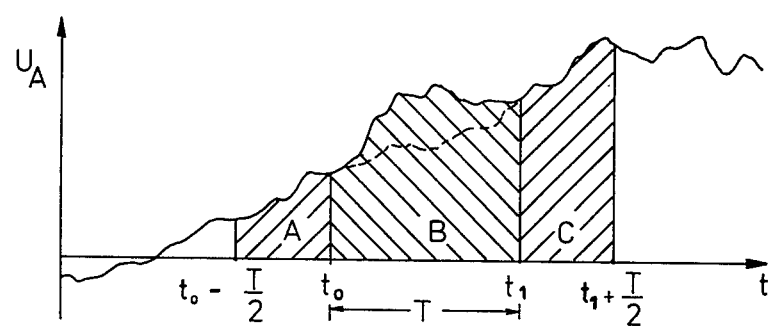
FIG. 6 represents the waveform of an uninfluenced and influenced output signal during various time periods of the welding process.

FIG. 6 shows the output signal $U_A(t)$ of the differential amplifier 10, as produced by a submerged arc welding machine and electrical analog. During time interval $t_o-t_1$ the welding arc is influenced by a magnetic field. Without such influence, output signal $U_A(t)$ would have taken the course shown by the broken lines, during interval $t_o-t_1$.

As described in applicant's copending U.S. application, Ser. No. 935,459, filed on Aug. 21, 1978, a continuation of application Ser. No. 707,012, filed on July 20, 1976, now abandoned, such a change—produced by deflection of the welding arc by means of a magnetic field—of the electrical operating values represents information, and a feedback signal which can be used for the control of the welding machine, and in particular, for the lateral guidance of the welding arc alongside a welding joint.

As seen in FIG. 6, the difference between the undisturbed course (represented by the broken line) of $U_A(t)$ and the change occurring during the deflection, is so small that this difference can only be detected and evaluated with great difficulties.

To be able to decode the information which is contained in the feedback signal as supplied by the differential amplifier, the change of the initial value $U_A(t)$—as caused by the noise level of the welding process—is observed before as well as after the time interval during which the information, by means of deflection of the arc, affects the initial value $U_A(t)$ and changes the same.

We start with the following consideration: With an uninfluenced welding process, the initial value $U_A(t)$ changes in the time interval $t_o-t_1$ so that the following equation is met:

$$\int_{t_o-T/2}^{t_o} U_A(t)\, dt + \int_{t_1}^{t_1+T/2} U_A(t)\, dt - \int_{t_o}^{t_1} U_A(t)\, dt = 0$$

If, during the time interval $t_o-t_1$, the welding machine is excited for the duration T, for example, by deflecting the arc from its stationary position by means of a magnetic field, $U_A(t)$ will change during this time interval so that the result of the above equation does not equal zero. The condition of the welding process can be indicated by sign and value of the result of the equation, which in the given example, is a measure of the change of the arc length upon a magnetic deflection of the welding arc.

Figure 7:
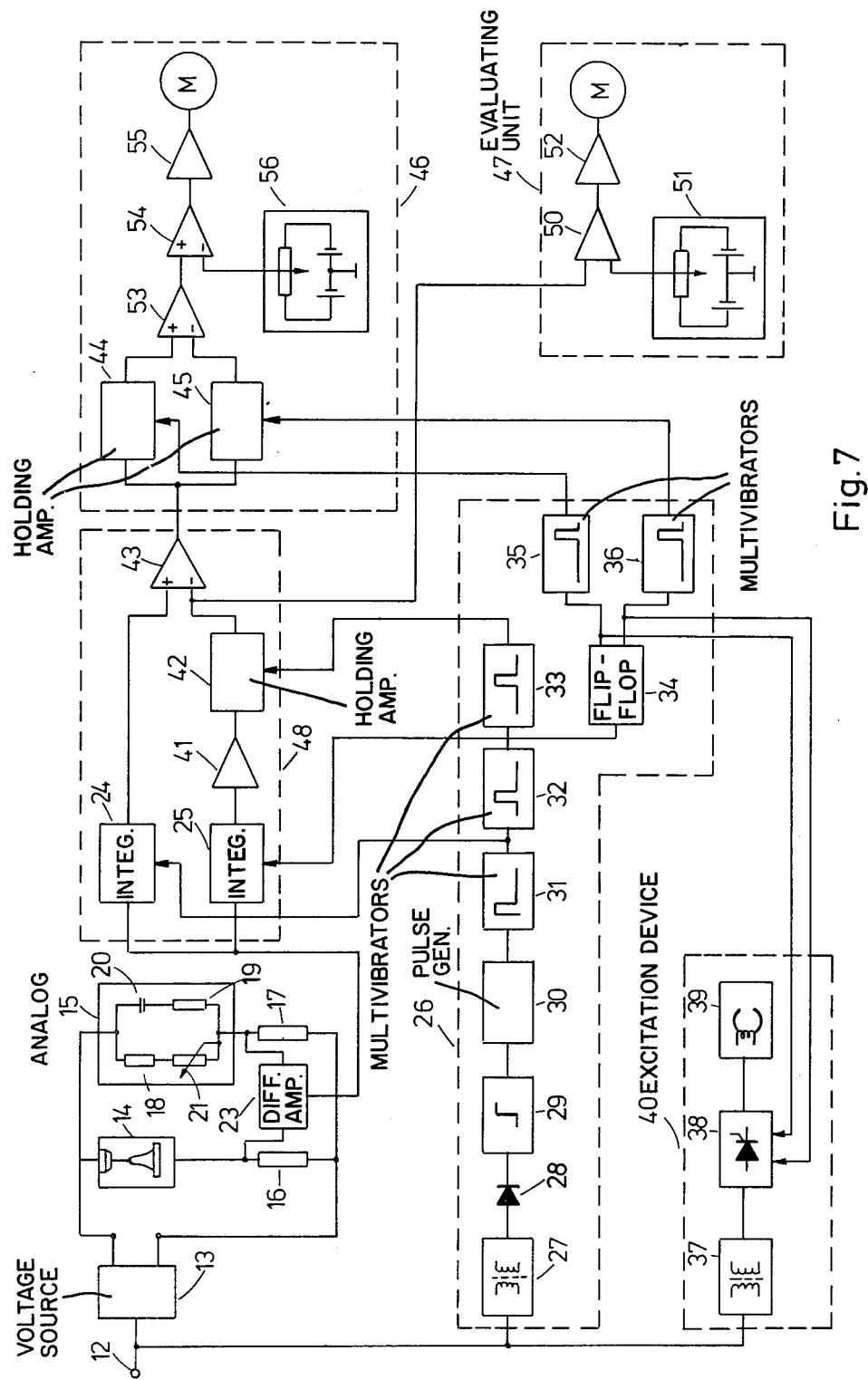
FIG. 7 shows a circuit diagram for obtaining parameter-indicative control signals for controlling the lateral position and height of a welding tool.

FIG. 7 shows an electrical circuit for obtaining feedback signals from noise-level electrical operating values of a welding machine for its regulation. These feedback signals are used for lateral guidance of the welding arc as well as for height adjustment of the burner.

A welding energy source 13, connected to an electrical alternating current network 12, supplies energy to a welding machine 14 and an electrical analog 15. The schematically indicated welding machine 14 shall incorporate the electrical line, the burner, the arc, and the welding material. The analog 15 corresponds with the embodiment shown in FIG. 3, i.e. it contains an ohmic resistance 18 which is connected in parallel with a series arrangement of ohmic resistance 19 and a condenser 20. In series with ohmic resistance 18 is a potentiometer 21, so that analog 15 can be adjusted to the desired welding process. As in the embodiment according to FIG. 4, a bridge circuit is formed by a series arrangement of welding machine 14 and a measuring resistor 16 on the one hand, and of analog 15 and a measuring resistor 17 on the other hand.

A differential amplifier 23, located between the junctions of the two series connections, supplies signals to two parallel integrators 24 and 25 whose operation is controlled by a timing control circuit 26.

The control circuit 26 is supplied from the a-c line 12, and produces cyclically recurrent control signals through a transformer 27, a rectifier 28, a Schmitt-trigger 29, a pulse generator 30, monostable multivibrators 31, 32 and 33, respectively, a flip-flop device 34, and monostable multivibrators 35 and 36 respectively.

The flip-flop circuit 34 supplies control impulses alternately on one of its two outputs which are connected to two inlets of an excitation device 40 which influences the welding process during time interval $t_o-t_1$. In the embodiment shown, the excitation device 40 is designed for the production of a magnetic field which penetrates the weld arc and deflects it from its stationary position.

The excitation device 40 has a transformer 37—fed by a-c current 12—which is connected to a thyristor bridge 38; which is connected to the outputs of the flip-flop circuit 34; the thyristor bridge 38 excites an electromagnet 39, which deflects the arc of the welding machine 14 laterally, and alternately in opposite directions by control of the impulses from flip-flop 34. Such deflection of the arc occurs during the time interval $t_o-t_1$ and has the duration T (cf. FIG. 6).

In the processing unit 48 for the output signal of differential amplifier 23, integrator 25 is connected through an amplifier 41 to holding amplifier 42 whose output signal is supplied to a subtraction circuit 43; the subtraction circuit 43 receives on its other input the output signal from integrator 24.

The output signal of the subtraction circuit 43 is supplied to a unit 46 which controls the lateral guidance of the burner alongside the welding joint. The output signal of the subtraction circuit 43 is supplied to two parallel holding amplifiers 44 and 45 of the lateral guidance unit 46, whose output signals are subtracted for each other in a subtraction circuit 53. The output signal of the subtraction circuit 53 is supplied to an input of a further subtraction circuit 54 which receives on its other input the output signal of a reference signal source 56. The reference signal source 56 supplies a signal which represents the desired value for the lateral guidance of the arc in the welding joint, i.e., for example, the setting of the welding arc in the center of the joint. If the output signal is the subtraction circuit 54 is equal to zero, then the arc is located in the center of the joint. If the output signal in the subtraction circuit 54 deviates from the zero, it is amplified by an amplifier 55 and, through a servo motor M, is used for the lateral guidance of the burner alongside the weld joint.

The output signal of the holding amplifier 42 of the processing unit 48 is also supplied to an evaluating unit 47 which is designed, as shown in FIG. 4, and as already described above, to control height adjustment of the burner.

The monostable multivibrators 31, 32, 33, 35 and 36 are all connected and their impulse times are set such that they function as follows: At time period $t_o - T/2$ (cf. FIG. 6), integrator 24 is started through monostable multivibrator 31, to integrate the output signal of the differential amplifier 23. During the time interval $t_o - T/2$ to $t_0$, the output signal of amplifier 23 is not yet influenced by the deflection of the arc.

At time period $t_o$, during which the arc is laterally deflected by means of the control impulses produced by flip-flop 34, integrator 25 is started through monostable multivibrator 32 to integrate the output signal of amplifier 23, during time interval T, as influenced by the deflection of the arc.

At period $t_1$, deflection of the arc from its normal position has been completed. Through the monostable multivibrator 33, the result of the integration is stored in holding amplifier 42 after amplification by a factor of 2 by means of amplifier 41. At time period $t_1 + T/2$, again with uninfluenced arc, the difference of the output signals of integrator 24 and of holding amplifier 42 is stored alternately in holding amplifiers 44 or 45, through the monostable multivibrators 35 and 36, under the control of flip-flop 34.

Thus, under the control of flip-flop 34, the alternating storage of the differences in holding amplifiers 44 and 45 is synchronized with the alternating lateral deflection of the welding arc, caused by excitation device 40. Therefore, the signal stored in amplifier 44 corresponds with the arc deflection in one direction and the signal stored in amplifier 45 corresponds with the arc deflection in the opposite direction. When these stored signals are equal, the arc is moving along the center of the weld joint, and when the signals are unequal, the feedback signals and unit 46 will operate to correct the lateral position of the arc so that it returns to the center of the sloping surfaces of the weld joint.

It should be noted that the output signal of the subtraction circuit 43, at the time of storage in one of the two holding amplifiers 44 or 45 of the lateral guidance unit 46, is proportional to a value which corresponds with the following mathematical combination of the integration areas A, B, and C (cf. FIG. 6):

$$A+B+C-2B=A-B+C$$

The thus processed and stored measuring signal is then used in unit 46 for the lateral guidance of the burner along the center of the welding joint as follows: The output signals of the holding amplifiers 44 and 45 are subtracted from one another in another subtaction circuit 53; and the output signal of the subtraction circuit 53 is then compared in another subtraction circuit 54 with the reference signal of the reference signal source 56; and then is finally used—through another amplifier 55 and a servo motor M—for adjusting the lateral shifting of the burner to the center of the weld joint.

Also, the value stored in holding amplifier 42 is a measure of the distance of the burner from the welding piece so that this value can be applied in the above described manner for the height control and adjustment of the burner.

Therefore, through cyclic renewal of the values stored in amplifiers 44 and 45, which is controlled by control circuit 26 and is synchronized with the deflection of the arc in opposite directions from its stationary position, a sequence of measuring values and feedback signals is produced which permits a continuous height control and lateral control of the welding tool.

A latitude of modification, change and substitution is intended in the foregoing disclosure and, in some instances, some features of the invention will be employed without a corresponding use of other features. Accordingly it is appropriate that the appended claims be construed broadly and in a manner consistent with the spirit and scope of the invention herein.

What is claimed is:

1. Apparatus for controlling a parameter of an arc welding machine, said parameter affecting the current flow in said welding machine comprising:
    means for providing a voltage between first and second terminals,
    a parallel circuit supplied by said voltage having first and second branches connected between said first and second terminals,
    said first branch including the arc welding machine to be controlled,
    said second branch including an electrical analog of the static and dynamic current-voltage characteristics of said welding machine when operating as desired,
    means for comparing the current in said first and second branches for providing a parameter-indicative signal representing the current difference between said first and second branches, and
    means responsive to said parameter-indicative signal for adjusting the parameter of said welding machine.

2. Apparatus according to claim 1 wherein said adjusting means includes means for changing the position of the welding tool with respect to a workpiece in response to said parameter-indicative signal.

3. Apparatus according to claim 2 further including holding amplifiers and means for integrating said parameter-indicative signal, the output of said integrating means being connected to said holding amplifiers, the output of said holding amplifiers being connected to said means for changing the position of the welding tool with respect to the work.

4. Apparatus according to claim 3 further including excitation means for producing a magnetic field to laterally deflect said welding tool, a timing control circuit for supplying signals to and controlling said integrating means, said excitation means and said holding amplifiers, said timing control circuit including means for alternately storing signals in said holding amplifiers and for alternately energizing said excitation means to laterally deflect said welding tool in opposite directions in synchronization with said means of alternately storing signals.

5. Apparatus according to claim 1 wherein said electrical analog is formed by an electrical network comprising a first resistor in parallel with a series connection of a second resistor and a condenser.

6. Apparatus according to claim 5 wherein at least one of said resistors is a potentiometer for adjusting and setting said electrical analog to have the desired current value.

7. Apparatus according to claim 1 wherein said parallel circuit is a bridge circuit and wherein said first and second branches each include a measuring resistor.

8. Apparatus according to claim 7 wherein said comparing means includes a differential amplifier connected to said first and second branches of said bridge circuit to produce said parameter indicative signal.

9. Apparatus accordng to claim 1 wherein said adjusting means includes means for changing the lateral position of the welding tool in response to said parameter-indicative signal to guide said welding arc along the center of a weld joint.

10. Apparatus according to claim 1 further including means for integrating said parameter-indicative signal to suppress high frequency noise levels.

11. Apparatus according to claim 1 wherein said adjusting means includes means for changing the height and lateral position of the welding tool with respect to a workpiece in response to said parameter-indicative signal, first means for integrating said parameter-indicative signal during first, second and third time periods to produce a first sum, second means for integrating said parameter-indicative signal during said second time period to produce a second sum, and means for subtracting said second sum from said first sum to produce electrical signals for controlling said changing means to change the height and lateral position of the welding tool.

12. Apparatus according to claim 11 further including holding amplifiers for receiving said electrical signals from said subtracting means, and further including means for subtracting the signal in one of the said holding amplifiers from the signal in the other of said holding amplifiers to produce an electrical signal for controlling said changing means to change the lateral position of the welding tool.

* * * * *